США10647870B2

(12) United States Patent
Gupta et al.

(10) Patent No.: US 10,647,870 B2
(45) Date of Patent: May 12, 2020

(54) NON-ETHERIFIED REACTION PRODUCT OF A CYCLIC UREA AND A MULTIFUNCTIONAL ALDEHYDE

(71) Applicant: Allnex Netherlands B.V., Bergen op Zoom (NL)

(72) Inventors: Ram Gupta, Stamford, CT (US); Lawrence Flood, Norwalk, CT (US); Urvee Treasurer, Stamford, CT (US); Barry Lawless, Milford, CT (US); Colin Brogan, Stamford, CT (US)

(73) Assignee: ALLNEX NETHERLANDS B.V., Bergen op Zoom (NL)

( * ) Notice: Subject to any disclaimer, the term of this patent is extended or adjusted under 35 U.S.C. 154(b) by 0 days.

(21) Appl. No.: 16/204,209

(22) Filed: Nov. 29, 2018

(65) Prior Publication Data

US 2019/0092962 A1    Mar. 28, 2019

Related U.S. Application Data

(62) Division of application No. 13/876,545, filed as application No. PCT/US2011/053054 on Sep. 23, 2011, now Pat. No. 10,174,219.

(30) Foreign Application Priority Data

Sep. 30, 2010   (EP) .................................. 10185095

(51) Int. Cl.
    *C09D 133/02*  (2006.01)
    *C08G 12/12*   (2006.01)
    *C08G 12/36*   (2006.01)
    *C09D 161/24*  (2006.01)

(52) U.S. Cl.
    CPC ........... *C09D 133/02* (2013.01); *C08G 12/12* (2013.01); *C08G 12/36* (2013.01); *C09D 161/24* (2013.01)

(58) Field of Classification Search
    CPC .... C09D 133/02; C08G 18/544; C08G 12/12; C08G 12/36; C08L 61/24
    USPC ........................................................ 524/593
    See application file for complete search history.

(56) References Cited

U.S. PATENT DOCUMENTS

| 3,574,786 A * | 4/1971 | Ishida .................... C08G 73/00 524/91 |
| 4,284,758 A | 8/1981 | North |
| 4,300,898 A | 11/1981 | North |
| 4,345,063 A | 8/1982 | North |
| 4,363,906 A * | 12/1982 | Cicchetti ................ C08G 12/26 524/593 |
| 4,395,504 A | 7/1983 | Sulzberg et al. |
| 4,471,087 A | 9/1984 | Lipowski |
| 6,642,289 B2 * | 11/2003 | Harashina ............ C08K 5/3445 524/106 |
| 7,381,347 B2 | 6/2008 | Jacobs, III et al. |
| 8,765,850 B2 * | 7/2014 | Iwamoto ................ C08G 12/14 524/192 |
| 9,605,178 B2 * | 3/2017 | Gupta .................... C08G 12/12 |
| 10,155,836 B2 * | 12/2018 | Gupta .................... B32B 21/02 |
| 2006/0252855 A1 | 11/2006 | Pisanova |
| 2010/0196731 A1 | 8/2010 | Jikihara et al. |
| 2010/0297356 A1 | 11/2010 | Flood |

FOREIGN PATENT DOCUMENTS

| JP | 57-82580 | 5/1982 |
| JP | 2006-523261 | 10/2006 |
| JP | 2009-79175 | 4/2009 |
| WO | 2007/099156 | 7/2007 |
| WO | 2009/041358 | 4/2009 |
| WO | 2009/073836 | 6/2009 |

OTHER PUBLICATIONS

International Search Report dated Nov. 25, 2011 in International (PCT) Application No. PCT/US2011/053054.
J. Kliegman et al., "Glyoxal Derivatives. V. Reaction of Alcohols with Glyoxal", J. Org. Chem., vol. 38, No. 3, 1973, p. 556-560.
S. Mahajani et al., "Reaction of Glyoxal with Aliphatic Alcohols Using Cationic Exchange Resins as Catalysts", Organic Process Research & Development, vol. 1, 1997, pp. 97-105.
English abstract of JP No. 53-044567, Apr. 21, 1978, cited in the specification.

* cited by examiner

*Primary Examiner* — Jane L Stanley
(74) *Attorney, Agent, or Firm* — Wenderoth, Lind & Ponack, L.L.P.

(57) ABSTRACT

The invention relates to a coating composition comprising a reaction product UA of at least one multifunctional aldehyde A with at least one cyclic urea U, and a crosslinkable resin having at least one kind of functional groups selected from the group consisting of hydroxyl functional groups, acid functional groups, amide functional groups, amino functional groups, imino functional groups, mercaptan functional groups, phosphine functional groups, and carbamate functional groups, characterised in that the degree of etherification, measured as the ratio «(13 O—R)/«(U) of the amount of substance n(—O—R) of alkoxy groups as substituents of the aldehyde carbon atoms of the multifunctional aldehyde chemically bound in the reaction product UA to the amount of substance «(U) of cyclic urea U chemically bound in the reaction products, is less than 0.01 mol/mol, and to a process for the preparation of the reaction product UA.

11 Claims, No Drawings

NON-ETHERIFIED REACTION PRODUCT OF A CYCLIC UREA AND A MULTIFUNCTIONAL ALDEHYDE

FIELD OF THE INVENTION

The present invention is directed to a non-etherified reaction product of a cyclic urea and a multifunctional aldehyde. It is also directed to a process of making this reaction product, and to the product provided by this process, as well as a coating composition comprising the said reaction product, and to a method of use of the said coating composition to provide a coating on a substrate.

BACKGROUND OF THE INVENTION

Industrial coatings are used to protect the surface of a substrate against deterioration brought about by the action of light, humidity, wear, atmospheric oxygen, and other chemicals, and to impart the desired appearance such as colour, gloss, and surface structure. In many cases, such coatings are based on organic polymers which show good adhesion to the substrate and form a film free from defects such as pores or blisters. Film formation, also referred to as drying, is the transition of the coating composition applied to the solid state. The solid film can be formed from a solution by removal of solvent or from a dispersion by removal of the dispersing agent, or from a melt by cooling. In this case, and if no chemical reaction occurs, this is referred to as "physical drying". In the so-called chemical drying, chemical reactions occur during film formation which lead to crosslinked macromolecules. Such crosslinking may be caused by chemical reaction of low molar mass molecules, oligomers or macromolecules between themselves, such as addition or condensation reactions, or radiation induced or thermally induced polymerisation, or by the action of added polyfunctional molecules, the so-called crosslinkers, which react with functional groups of polymers usually referred to as binder resins.

A well-known class of crosslinkers used in conjunction with binder resins having active hydrogen-containing reactive groups, such as hydroxyl and carboxyl groups, are the so-called amino resins, which are hydroxy functional adducts of aldehydes, generally formaldehyde, and organic amino compounds such as triazines, particularly preferably melamine, and urea or derivatives of these, the hydroxyl groups of which are usually at least partially etherified with lower alcohols such as methanol, and n- or iso-butanol. These crosslinkers suffer from the drawback that formaldehyde, inter alia, is liberated during the curing or crosslinking reaction. Emission of formaldehyde is environmentally undesirable. Additionally, many of these amino resins need temperatures typically of at least 80° C. to act as crosslinkers. Heating to such elevated temperatures is both time-consuming and energy-consuming.

In the PCT application WO2009/073836 A1, a process is disclosed for the preparation of crosslinkers based on reaction products of cyclic ureas and multifunctional aldehydes having at least two aldehyde groups which can be used in coating compositions comprising active hydrogen containing resins, such as hydroxy functional alkyd, acrylic, urethane or epoxy resins, and which coating compositions can be cured with such crosslinkers even at ambient temperature. The coatings prepared therewith showed good stability against solvents, and were not prone to yellowing. This process makes use of a multi-step reaction sequence where in the first step, the aldehyde component is mixed with an alcohol, and reacted under acidic conditions leading to formation of hemiacetals and acetals, and then in the second step, this mixture is reacted with a cyclic urea which may be preformed, or formed in situ. Depending on the reaction time, reaction conditions, and storage time in the first step, the hemiacetals and acetals may undergo oligomerisation, disproportionation and condensation reactions, leading to formation of a mixture of individual compounds such as mono- and diacetals of monomeric, dimeric or trimeric glyoxal, esters of glyoxylic acid, and glycolates. See S. Mahajani and M. M. Sharma in Organic Process Research and Development, 1997, No. 1, pages 97 to 105; and J. M. Kliegman and R. K. Barnes, J. Org. Chem., Vol. 38 (1973), No. 3, pages 556 et seq. The composition of this mixture has been found to be difficult to control. Owing to the fact that the aldehyde is converted to its acetal or hemiacetal, there is no possibility to form non-etherified adducts.

In the Japanese Patent Publication 53-044567, reaction of glyoxal with cyclic urea (2:1 mole ratio) in presence of a strong acid is disclosed. Our attempts at reacting glyoxal with ethylene urea (at a ratio of the amounts of substance of 1.2:1 mol/mol) in presence of a strong acid led to the formation of a rubbery gel-like solid product unusable for surface coating applications.

SUMMARY OF THE INVENTION

It is the object of the invention, therefore to provide a crosslinking composition or curing agent that does not liberate, or has a reduced emission of, formaldehyde and/or alcohol, upon curing, compared to the customary melamine-formaldehyde resin crosslinkers, and that allows lower curing temperatures, preferably below 80° C.

This object has been realised by providing a coating composition comprising a reaction product UA of at least one multifunctional aldehyde A with at least one cyclic urea U, and a crosslinkable resin having at least one kind of functional groups selected from the group consisting of hydroxyl functional groups, acid functional groups, amide functional groups, amino functional groups, imino functional groups, mercaptan functional groups, phosphine functional groups, and carbamate functional groups, wherein the degree of etherification, measured as the ratio $n(\text{—O—R})/n(U)$ of the amount of substance $n(\text{—O—R})$ of alkoxy groups as substituents of the aldehyde carbon atoms of the multifunctional aldehyde chemically bound in the reaction product UA to the amount of substance $n(U)$ of cyclic urea U chemically bound in the reaction products, is less than 0.01 mol/mol.

A further object of the invention is a coating composition comprising a reaction product UA of at least one multifunctional aldehyde A with at least one cyclic urea U, and a crosslinkable resin having at least one kind of functional groups selected from the group consisting of hydroxyl functional groups, acid functional groups, amide functional groups, amino functional groups, imino functional groups, mercaptan functional groups, phosphine functional groups, and carbamate functional groups, wherein in that the degree of etherification, measured as the ratio $n(\text{—O—R})/n(U)$ of the amount of substance $n(\text{—O—R})$ of alkoxy groups as substituents of the aldehyde carbon atoms of the multifunctional aldehyde chemically bound in the reaction product UA to the amount of substance $n(U)$ of cyclic urea U chemically bound in the reaction products, is less than 0.01 mol/mol, and further comprising at least one crosslinking agent (b) selected from the group consisting of (b1) reaction products of an aminotriazine and at least one aldehyde selected from the group consisting of aliphatic monoaldehydes and multifunctional aliphatic aldehydes having the structure Y(CHO)$_n$, where Y is an n-functional aliphatic residue, and n is greater than 1,
(b2) reaction products of urea and/or cyclic ureas and aliphatic monoaldehydes,
(b3) alkoxycarbonylaminotriazines,
(b4) multifunctional isocyanates which may be partially or completely blocked,
(b5) reaction products of phenols and aliphatic monoaldehydes,
(b6) multifunctional epoxides,
(b7) multifunctional aziridines,
(b8) multifunctional carbodiimides.

A still further object of the invention is a method of use of a reaction product UA as described supra of at least one multifunctional aldehyde A with at least one cyclic urea U, alone or in mixture with at least one crosslinking agent (b) selected from the group consisting of
(b1) reaction products of an aminotriazine and at least one aldehyde selected from the group consisting of aliphatic monoaldehydes and multifunctional aliphatic aldehydes having the structure Y(CHO)$_n$, where Y is an n-functional aliphatic residue, and n is greater than 1,
(b2) reaction products of urea and/or cyclic ureas and aliphatic monoaldehydes,
(b3) alkoxycarbonylaminotriazines,
(b4) multifunctional isocyanates which may be partially or completely blocked,
(b5) reaction products of phenols and aliphatic monoaldehydes,
(b6) multifunctional epoxides,
(b7) multifunctional aziridines,
(b8) multifunctional carbodiimides,
as a crosslinker in a coating composition that comprises at least one crosslinkable binder resin having functional groups selected from the group consisting of hydroxyl groups, acid groups, amino groups, imino groups, amide groups, mercaptan groups, phosphine groups, and carbamate groups.

A still further object of the invention is a process for making the said reaction product UA of at least one multifunctional aldehyde A and at least one cyclic urea U, wherein the ratio of the amount of substance of aldehyde groups n(—CHO) in the multifunctional aldehyde A and the amount of substance of groups n(—CO—NH) in the cyclic urea U is from 0.2 mol/mol to 4 mol/mol, and wherein the reaction of U and A is optionally conducted in the presence of a solvent which does not have functional groups that are reactive with the said at least one multifunctional aldehyde A or the said at least one cyclic urea U, or the reaction product UA.

A still further object of the invention is a process for making the said reaction product UA of at least one multifunctional aldehyde A and at least one cyclic urea U, wherein the ratio of the amount of substance of aldehyde groups n(—CHO) in the multifunctional aldehyde A and the amount of substance of groups n(—CO—NH) in the cyclic urea U is from 0.2 mol/mol to 4 mol/mol, and wherein the process comprises at least two steps, where in the first step, the amount of multifunctional aldehyde A used is between 20% and 80% of the total amount of A, and that after the first step, in at least one further step, further quantities of multifunctional aldehyde A are added and reacted with the reaction mixture formed in the previous step.

A still further object of the invention is a process as described hereinbefore wherein a solvent which does not have functional groups that are reactive with the said at least one multifunctional aldehyde A or the said at least one cyclic urea U, or the reaction product UA is added to the reaction mixture for the first step, or after the first step.

A still further object of the invention is a coating composition comprising a crosslinkable binder resin having active hydrogen functionality, and the reaction product UA as crosslinker.

DETAILED DESCRIPTION OF THE PREFERRED EMBODIMENTS

It is preferred that the reaction product UA has a ratio of the amount of substance of residual >NH groups to the amount of substance of moieties derived from the cyclic urea U of not more than 0.2 mol/mol.

The multifunctional aldehyde A has the formula OHC—R'—CHO where R' may be a direct bond or an aliphatic divalent radical which may be linear, branched or cyclic and may have from one to twenty carbon atoms, both these options for R' leading to a divalent aldehyde having exactly two —CHO groups, or an aliphatic divalent radical which may be linear, branched or cyclic and may have from one to twenty carbon atoms, and carries at least one additional aldehyde group —CHO, which latter option leads to trivalent or polyvalent aldehydes having at least three aldehyde groups.

"Multifunctional" is used to denote, in the context of this invention, a molecule having more than one functional group. Preferred aldehydes are divalent aliphatic aldehydes, particularly glyoxal, malonic dialdehyde, succinic dialdehyde, and glutaric dialdehyde. Especially preferred is glyoxal. It is also possible to use mixtures of these, preferably mixtures comprising a mass fraction of at least 50% of glyoxal, particularly preferred, at least 70% of glyoxal. Glyoxal may be used for this invention in aqueous solution, as anhydrous solid which has to be cooled as its melting temperature is 15° C., or in the form of its dimer or trimer, optionally in solid hydrated form as dihydrates, or in the form of its addition products with sulphites or hydrogen sulphites which decompose under acidic conditions.

The cyclic ureas U which may be used according to the present invention have at least one unsubstituted amidic >NH group. These cyclic ureas U are cycloaliphatic or bicycloaliphatic compounds having an element of the structure —NH—CO—NH— within a ring structure, the total number of ring atoms preferably being from 5 to 7 (ethylene urea, 1,2-propylene urea, 1,3-propylene urea, 1,4-butylene urea or tetramethylene urea). Particularly preferred is ethylene urea. In the case of a bicyclic compound, the simplest structure is glycoluril or acetylene diurea. These cyclic ureas may be substituted, preferably by alkyl groups on the N- or C-atoms, or both, the alkyl residues preferably having from one to four carbon atoms. At least one of the nitrogen atoms must remain unsubstituted to enable reaction with the aldehyde functional molecule. Preferably, the at least one cyclic urea U is selected from the group U1 consisting of ethylene urea, 1,2 propylene urea, hydantoin also known as glycolyl urea, and parabanic acid also known as oxalyl urea, and glycoluril, and from the group U2 consisting of the cyclic ureas U1 which additionally have at least one substituent $R^3$ on at least one of the nitrogen or carbon atoms of the said cyclic ureas U1, with the proviso that at least one nitrogen atom is unsubstituted, and the substituent $R^3$ is selected from the group consisting of linear, branched and cyclic alkyl groups having from 1 to 10 carbon atoms.

A particularly preferred combination is glyoxal reacted with ethylene urea, and optionally, either glyoxal, or ethylene urea, or both, in mixture with other multifunctional aldehydes and/or other cyclic ureas.

It has been found that when using purified cyclic ureas instead of commercially available qualities, e.g. commercial ethylene urea which has about 96% purity (the mass fraction of ethylene urea in one commercially available product is (96.0 ±0.5) %), both colour and stability of the reaction product with multifunctional aldehydes are improved. Purification can be done by the usual processes such as recrystallisation, extraction, adsorption and ion exchange reactions, distillation, or sublimation, or complexation, and preferably by melt crystallisation which latter process has the advantages of low energy consumption, high space-time yield, and consistently good quality.

It has been found that higher molar mass reaction products UA can be made by a multi-step process, where in step a), the amount of multifunctional aldehyde A added is less than 90% of the stoichiometric amount needed, preferably between 20% and 80% of the stoichiometric amount needed, and particularly preferably, between 30% and 70% of the stoichiometric amount needed, and that after step a), a further quantity of multifunctional aldehyde A is added and reacted with the reaction mixture formed in step a) wherein the total amount of multifunctional aldehyde A added is chosen such that the ratio of the amount of substance of aldehyde groups n(—CHO) in the multifunctional aldehyde A and the amount of substance of groups n(—CO—NH) in the cyclic urea U is from 0.2 mol/mol to 4.0 mol/mol, preferably from 0.8 mol/mol to 1.40 mol/mol, and especially preferred, from 1.0 mol/mol to 1.30 mol/mol.

It has further been found that the reaction between the cyclic urea U and the multifunctional aliphatic aldehyde A can optionally be conducted in the presence of a solvent which does not react with either of the cyclic urea U, the multifunctional aliphatic aldehyde A, and the reaction product UA of these. The solvent may be added to the reaction mixture for the first step, or to the reaction mixture after the first step, in a multistep process. Useful solvents are at least partially miscible with water, meaning that they form mixed phases containing a mass fraction of at least 5% of water, particularly polar aprotic solvents such as dimethyl formamide or dimethyl acetamide or N-methyl pyrrolidinone, aromatic and aliphatic esters, paraffins and mixtures thereof, aliphatic branched hydrocarbons, and linear, branched and cyclic aliphatic ethers. These solvents may also be used to remove water in an azeotropic distillation from the starting products which can be added in the form of their aqueous solutions, or of hydrates.

In a preferred variant, the mixture of cyclic urea U, multifunctional aldehyde A, and optionally, water or solvent, is concentrated before or during the reaction by removing volatile constituents by distillation, or distillation under reduced pressure.

In the process according to the invention, the following additional preferred measures may be realised, singly, or in any combination:
the multifunctional aldehyde A is charged first,
the cyclic urea U is charged first,
water may be added to the multifunctional aldehyde A, or to the cyclic urea U, or to their mixture
a solvent may be added which does not react with either of the cyclic urea U, the multifunctional aliphatic aldehyde A, and the reaction product UA of these the pH of the mixture of the multifunctional aldehyde A and the cyclic urea U may be adjusted to from 5.0 to 8.0, preferably from 5.5 to 7.5, and particularly preferably, from 6.2 to 6.8,
the mixture of the cyclic urea U and the multifunctional aldehyde may be heated to from ambient to less than 80° C., preferably, to between 35° C. and 50° C.,
the mass of cyclic urea U and the mass of aldehyde A present in the reaction mixture are preferably chosen such that the following condition is met for ratio of the amount of substance n(—CHO) of aldehyde groups in the multifunctional aldehyde, and, in the case of mixtures of aldehydes, and the amount of substance of groups —CO—NH— in the cyclic urea U:
0.2 mol/mol≤n(—CHO)/n(—CO—NH—)≤4 mol/mol
and particularly preferably,
1.0 mol/mol≤n(—CHO)/n(—CO—NH—) ≤1.30 mol/mol.

In a preferred variant, at least a part of the water present, and further optionally, at least a part of the at least one solvent that has no reactive groups which react with aldehyde groups, amide groups, or hydroxyl groups, is removed by azeotropic distillation wherein a solvent is added that is immiscible with water in a way that it forms a phase separate from an aqueous phase containing at least a part of the water separated by distillation, wherein the phase different from the aqueous phase is recycled to the distillation still, or back to the reactor.

If a solid precipitate or a suspended solid is formed during the reaction, this solid matter is preferably separated by any of the usual processes such as centrifugation, or filtration.

It has further been found that the reaction between the cyclic urea U and the multifunctional aliphatic aldehyde A can preferably be conducted in the presence of a solvent which does not react with either of the cyclic urea U, the multifunctional aliphatic aldehyde A, and the reaction product UA of these. Useful solvents are aromatic compounds and mixtures thereof, such as the isomeric xylenes, mixtures thereof, also with toluene and ethyl benzene, aromatic and aliphatic esters, paraffins and mixtures thereof, aliphatic branched hydrocarbons, and linear, branched and cyclic aliphatic ethers, and particularly, polar aprotic solvents such as dimethyl formamide or dimethyl acetamide or N-methyl pyrrolidinone. These solvents may also be used to remove water in an azeotropic distillation from the starting products which can be added in the form of their aqueous solutions, or of hydrates.

It is also possible to remove solvents and water completely from the reaction mixture to yield a powder that can be used as a crosslinker or curing agent in powder coating compositions.

The reaction products thus obtained can be combined as crosslinker composition both with solvent borne and with water borne binder resins having active hydrogen functionality (preferably hydroxyl or carboxylic acid groups). It was found that the crosslinker compositions prepared according to the invention have a higher reactivity and can be used, in combination with an appropriate catalyst, for curing even at room temperature, and that the appearance of the cured films is also favourable for the crosslinkers according to the present invention, in yellowness and gloss and haziness.

Coating compositions are prepared by admixing the reaction product UA to a polymeric binder resin having active hydrogen atoms, i.e. at least one of hydroxyl groups, acid groups, preferably carboxyl groups, carbamate groups, amide groups, imide groups, amino groups, imino groups, mercaptan groups, or phosphine groups. The resulting mixture is homogenised, and applied to a substrate by spraying, brushing, wire coating, curtain coating, blade coating, roll coating, dipping, electrophoretic deposition, powder spraying, or electrostatic spraying.

The ratio of mass of solid binder resin to the mass of the reaction products UA is preferably from 99/1 to 50/50, particularly preferably from 95/5 to 60/40, and most preferred, from 90/10 to 70/30.

In a further preferred variant, a mixture of the reaction products UA and at least one of the crosslinkers (b) as detailed supra is supplied as a crosslinking composition, where the activation temperatures of crosslinker (a) and the activation temperature of crosslinker (b) differ by at least 10 K, where the activation temperature of crosslinker (a) is lower than the activation temperature of crosslinker (b).

When using such mixtures of reaction products UA and at least one of the crosslinkers (b) as detailed supra, the ratio of the mass m(UA) of the reaction product UA to the mass m(b) of the crosslinker (b), or to the sum m(b tot) of the masses of all crosslinkers (b) in the mixture in the case that more than one of these crosslinkers (b) is used, is from 1/99 to 99/1, preferably from 10/90 to 90/10, and particularly preferred, from 30/70 to 70/30. The masses m as used herein always stand for the mass of the active ingredient, and not the mass of a solution containing the active ingredient, if not expressly indicated otherwise.

One particular and unexpected advantage of the crosslinker compositions according to the present invention is the fact that, depending on the mass fractions of components (a) and (b) in the crosslinker mixture, early development of hardness and dryness to dust or touch is developed which allows to handle coated substrates after curing either at room temperature (between 20° C. and 25° C.) for less than 24 h or at slightly elevated temperature below 50° C. after less than three hours. The coated substrates may then be transported to a large volume oven where the final hardness is procured by heating to the activation temperature needed for component (b) of the crosslinker mixture, wherein these large volume ovens are preferably equipped with off-gas incineration or absorption equipment.

Coating compositions are prepared by admixing the mixture comprising the reaction product UA and at least one of the crosslinkers (b) to a polymeric binder resin having active hydrogen atoms, i.e. at least one of hydroxyl groups, acid groups, preferably carboxyl groups, carbamate groups, amide groups, imide groups, amino groups, imino groups, mercaptan groups, or phosphine groups. The resulting mixture is homogenised, and applied to a substrate by spraying, brushing, wire coating, curtain coating, blade coating, roll coating, dipping, electrophoretic deposition, powder spraying, or electrostatic spraying.

The ratio of mass of solid binder resin to the sum of the mass of the reaction product UA and additional crosslinker (b) is preferably from 99/1 to 50/50, particularly preferably from 95/5 to 60/40, and most preferred, from 90/10 to 70/30.

The classes of resins mentioned supra can also be used as water-borne resins, in emulsified form which is achieved by external emulsification, i.e. by addition of ionic and/or non-ionic emulsifiers, or by internal emulsification, i.e., appropriate chemical modification of the resins as known in the art.

The coating compositions may further comprise at least one of water, an organic solvent, a catalyst, a filler, a pigment, a light stabiliser, a defoamer, a levelling agent, a wetting agent, a thickening agent, an antisettling agent, an antiskinning agent, and a preservative.

The reaction products UA of at least one multifunctional aldehyde A with at least one cyclic urea U, alone or together with at least one of the crosslinkers (b) as detailed supra can be used as a crosslinker in coating compositions that comprises at least one crosslinkable binder resin having functional groups selected from the group consisting of hydroxyl groups, acid groups, amino groups, imino groups, amide groups, mercaptan groups, phosphine groups, and carbamate groups.

Suitable active hydrogen-containing materials include, for example, polyfunctional hydroxy group containing materials such as polyols, hydroxyfunctional acrylic resins having pendant or terminal hydroxy functionalities, hydroxyfunctional polyester resins having pendant or terminal hydroxy functionalities, hydroxyfunctional polyurethane prepolymers, products derived from the reaction of epoxy compounds with an amine, and mixtures thereof. Acrylic and polyester resins are preferred. Examples of the polyfunctional hydroxy group containing materials include commercially available materials such as DURAMAC® 203-1385 alkyd resin (Eastman Chemical Co.); Beckosol® 12035 alkyd resin (Reichhold Chemical Co.), JONCRYL® 500 acrylic resin (S. C. Johnson & Sons, Racine, Wis.); AT-400 acrylic resin (Rohm & Haas, Philadelphia, Pa.); CARGILL® 3000 and 5776 polyester resins (Cargill, Minneapolis, Minn.); K-FLEX® XM-2302 and XM-2306 resins (King Industries, Norwalk, Conn.); CHEMPOL® 11-1369 resin (Cook Composites and Polymers, Port Washington, Wis.); CRYLCOAT® 3494 solid hydroxy terminated polyester resin (Cytec Industries Inc., Woodland Park, N.J.); RUCOTE® 101 polyester resin (Ruco Polymer, Hicksville, N.Y.); JONCRYL® SCX-800-A and SCX-800-B hydroxyfunctional solid acrylic resins (S. C. Johnson & Sons, Racine, Wis.).

Examples of carboxy-functional resins include CRYLCOAT® solid carboxy terminated polyester resin (Cytec Industries Inc., Woodland Park, N.J.). Suitable resins containing amino, amido, carbamate or mercaptan groups, including groups convertible thereto, are in general well-known to those of ordinary skill in the art and may be prepared by known methods including copolymerising a suitably functionalised monomer with a comonomer capable of copolymerising therewith. The classes of resins mentioned supra can also be used as water-borne resins, in emulsified form which is achieved by external emulsification (addition of ionic and/or non-ionic emulsifiers), or by appropriate chemical modification of the resins as known in the art.

Suitable catalysts are preferably acid catalysts, particularly those selected from the group consisting of organic sulphonic acids, organic phosphonic acids, organic sulphonimides, and Lewis acids, or salts or complexes of Lewis acids such as amine salts or ether complexes. Useful catalysts are para-toluene sulphonic acid (pTSA), dodecylbenzene sulphonic (DDBSA), dinonyl naphthalene sulphonic acid (DNNSA), and dinonyl naphthalene disulphonic acid (DNNDSA), which may also be blocked with volatile amines. Particularly preferred are N-methylsulphonyl-p-toluenesulphonamide (MTSI), para-toluene sulphonic acid (pTSA), dodecylbenzene sulphonic (DDBSA), dinonyl-naphthalene sulphonic acid (DNNSA), and dinonyl naphthalene disulphonic acid (DNNDSA). Blocked acid catalysts where the acid is liberated e.g. by heating can, of course, also be used, such as acid esters or reaction products of acids and epoxide functional compounds. Particularly useful catalysts are acid catalysts, such as toluene sulphonic acid, or dinonyl naphthalene disulphonic acid, which are usually dissolved in alcohol.

As these crosslinker compositions when adequately catalysed are active already at ambient temperature (20° C. to 25° C.), they are particularly useful to cure coatings on heat sensitive substrates, such as paper, cardboard, textiles, leather, wood, fabricated wood, and also plastics including composite materials, thermosets, and thermoplastics. They also work, of course, as crosslinkers for coating compositions that are used on substrates such as metals, stone, plaster, ceramics, glass, semiconductor surfaces, and concrete which allow higher curing temperatures. Application of said crosslinker composition in combination with the binder resins mentioned supra can also be considered where cure temperature or energy savings are an issue. Usual additives such as catalysts, defoamers, light stabilisers, fillers, antiskinning agents, antisettling agents, adhesion promoters, wetting agents, sag control agents, and pigments can, of course, be used in coating compositions comprising the crosslinker compositions of the present invention. Particularly useful catalysts are acid catalysts, such as toluene sulphonic acid, or dinonyl naphthalene disulphonic acid, which are usually dissolved in alcohol.

The curable compositions of this invention may preferably be employed as coatings in the general areas of coatings such as original equipment manufacturing (OEM) including automotive coatings, general industrial coatings including industrial maintenance coatings, architectural coatings, agricultural and construction equipment coatings (ACE), powder coatings, coil coatings, can coatings, wood coatings, and low temperature cure automotive refinish coatings. They are usable as coatings for wire, appliances, automotive parts, furniture, pipes, machinery, and the like. Suitable surfaces include plastics including composite materials, thermoplastics and thermosets, leather, textiles, wood, fabricated wood, ceramics, and glass, paper, cardboard, plaster, concrete, stone, semiconductor surfaces, and metals such as steel and aluminium. They can also be used in electronic applications, including coatings for metallised circuit boards, semiconductor surfaces, displays, and packaging for electronic circuitry.

Application of the reaction products UA in combination with the crosslinkable binder resins to a substrate may be effected by spraying, brushing, wire coating, curtain coating, roll coating, dipping, electrophoretic deposition, powder spraying, or electrostatic spraying.

It has been verified that the crosslinker compositions according to the invention can be combined with solvent borne or water borne binder resins having active hydrogen atoms (these resins collectively also referred to hereinafter as "active hydrogen material") which are preferably hydrogen atoms in hydroxy or carboxylic acid functionality, or both, particularly with hydroxy or carboxylic acid functional alkyd resin, hydroxy or carboxylic acid functional acrylic resins, hydroxy functional polyurethane resins, and hydroxy functional epoxy resins, to generate a curable composition which can be used as constituent for a coating composition. As these catalysed crosslinker compositions are active already at ambient temperature (20 C. to 25° C.), they are particularly useful to cure coatings on heat sensitive substrates, such as paper, cardboard, textiles, leather, wood, fabricated wood, and also plastics. They also work, of course, as crosslinkers for coating compositions that are used on substrates such as metals, stone, plaster, glass, ceramics, and concrete which allow higher curing temperatures. Application of said crosslinker composition in combination with the binder resins mentioned supra can also be considered where cure temperature or energy savings are an issue. Usual additives such as organic solvents, catalysts, coalescing agents, defoamers, levelling agents, fillers, light stabilisers, pigments, flow control agents, antiskinning agents, antisettling agents, wetting agents, preservatives, plasticisers, mould release agents, and corrosion inhibitors can, of course, be used in coating compositions comprising the crosslinker compositions of the present invention.

EXAMPLES

The following examples illustrate the invention, without intending to limit. All concentrations (strengths) and ratios stated in "%" are mass fractions (ratio of the mass $m_B$ of a specific substance B, divided by the mass m of the mixture, in the case of a concentration, or by the mass $m_D$ of the second substance D, in the case of a ratio). The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g". The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g". Dynamic viscosities were measured on the Gardner-Holt scale and converted to SI units (mPa·s). GO stands for glyoxal, and EU for ethylene urea. n is the symbol for the physical quantity "amount of substance" with the SI unit "mol". M is the symbol for the physical quantity "molar mass" with the SI unit "kg/mol". $^{13}$C-NMR analyses have been done with a Bruker-Oxford Avance II 400 NMR spectrometer with a 100 mm probe. Samples were prepared by diluting the reaction products with approximately the same mass of dimethyl sulphoxide-$d_6$.

Measurement of molar mass of the reaction products UA was done by HPSEC, or gel permeation chromatography, using dimethyl acetamide as solvent, at a sample concentration of 1 g/100 ml, a flow of 1.0 ml/min, a column temperature of 40° C., and refractometric detection, using a set of crosslinked polystyrene bead filled columns having a particle diameter of 5 im, with pore sizes of 100 nm (1×), 50 nm (2×), and 10 nm (3×), providing a measuring range of from 100 g/mol to 50 kg/mol, for calibration with polystyrene standards. Data collection and analysis was made with a software provided by Polymer Standards Service WinGPC system.

Example 1

2-Imidazolidinone-Ethanedial Resin in Water 210 g (1.45 mol) of an aqueous of glyoxal solution with a mass fraction of solids of 40% were charged to a 0.5 L reaction vessel under a nitrogen purge. 115 g (1.19 mol) of ethyleneurea hemihydrate were added, the pH was noted to be 3.0. The reaction temperature was raised to (50±5)° C. In less than thirty minutes, a very viscous reaction mass was formed which was found to be practically insoluble in water and other solvents.

Example 2

Non-Etherified 2-Imidazolidinone-Ethanedial Resin

A resin according to the invention with a ratio of n(GO):n(EU)=1.18 mol/mol was prepared by the following procedure:

290 g (2 mol) of an aqueous solution of glyoxal (ethane dial, with a mass fraction of solute of 40%) were charged to a reaction vessel under a nitrogen purge and the pH was adjusted to 6.2 by adding aqueous sodium bicarbonate solution (with a mass fraction of solids of 10%). 161.5 g (1.7 mol) of ethylene urea hemihydrate (M=95 g/mol; 2-imidazolidinone, solid) were added at ambient temperature over a period of between forty-five and sixty minutes. The reaction mixture was heated to 25° C., and a mild exotherm to between 35° C. and 40° C. was observed along with a pH increase of between 0.55 and 1.5. The temperature was raised to between 42° C. and 48° C. and held for one hour. Heating was then turned off, and the reaction mixture was allowed to cool to ambient (between 20° C. and 23° C.) for between three and four hours. After filtration, a straw yellow solution of the non-alkylated product was isolated having average values of dynamic viscosity of 570 mPa·s and of mass fraction of solids of 56.5%.

Example 3

Non-Etherified 2-Imidazolidinone-Ethanedial Resin

A resin according to the invention with a ratio of n(GO):n(EU)=1.10 mol/mol was prepared by the following procedure:

290 g (2 mol) of an aqueous solution of glyoxal (ethane dial, with a mass fraction of solute of 40%) were charged to a reaction vessel under a nitrogen purge and the pH was adjusted to 6.2 by adding aqueous sodium bicarbonate solution with a mass fraction of solids of 10%. 172 g (1.81 mol) of ethylene urea hemihydrate were then added at ambient temperature over a period of between forty-five and sixty minutes. The reaction mixture was heated to 25° C. and a mild exotherm to between 35° C. and 40° C. was observed along with a pH increase of between 0.55 and 1.5. The temperature was raised to between 42° C. and 48° C. and held for one hour. The heat was turned off and the reaction mixture was allowed to cool to ambient for between three and four hours. After filtration, a straw yellow solution of the non-alkylated product was isolated having an average value of dynamic viscosity of 1070 mPa·s and a mass fraction of solids of 58.6%.

Gel permeation chromatography yielded a number average molar mass $M_n$ of 587 g/mol, and a weight average molar mass $M_w$ of 854 g/mol, with a polydispersity $M_w/M_n$ of 1.45.

Example 4

Non-Etherified 2-Imidazolidinone-Ethanedial Resin

A resin according to the invention with a ratio of n(GO):n(EU)=1.20 mol/mol was prepared by the following procedure:

290 g (2 mol) of an aqueous solution of glyoxal (ethane dial, with a mass fraction of solute of 40%) were charged to a reaction vessel under a nitrogen purge and the pH was adjusted to 6.2 by adding aqueous sodium bicarbonate solution (with a mass fraction of solids of 10%). 158 g (1.66 mol) of ethylene urea hemihydrate were added at ambient temperature over a period of fifty minutes. The reaction mixture was heated to 25° C. and a mild exotherm to between 35° C. and 40° C. was observed along with a pH increase of approximately 1. The temperature was raised to 45° C. and held for one hour. The heat was turned off and the reaction mixture was allowed to cool to ambient between three and four hours. After filtration, a straw yellow solution of the non-etherified product was isolated having a dynamic viscosity of 931 mPa·s and a mass fraction of solids of 57.5%. Its number average molar mass $M_n$ was 621 g/mol, and its weight average molar mass $M_w$ was 833 g/mol, with a polydispersity $M_w/M_n$ of 1.34.

The stability of the non-etherified reaction product together with added solvent was tested as follows (example 4a):

30 g of the product of example 4 were diluted with 8 g of propylene glycol monomethyl ether solvent to provide a solution with mass fraction of solute of 45%. $^{13}$C-NMR of the solution thus obtained indicated no etherification with the propylene glycol monomethyl ether solvent. The resulting product was subjected to a stability test at 50° C. The product was found to be stable after one week at 50° C. with an increase in Gardner-Holt viscosity from T- to U equivalent to 538 mPa·s to 628 mPa·s.

The stability of the non-etherified reaction product together with added water was tested as follows (example 4b):

30 g of the product of example 4 were diluted with 8 g of deionised water to provide a solution with mass fraction of solute of approximately 45%. The resulting solution was subjected to stability test at 50° C. The product was found to have gelled after one week at 50° C.

It has been found by this comparison that addition of a solvent improves the storage stability of the reaction product of cyclic urea and multifunctional aldehyde.

In another embodiment of this invention it was surprisingly found that the when the glyoxal charge was split the reaction with ethylene urea proceeded smoothly resulting in the formation of a non-etherified product of higher weight-average molar mass $M_w$ and/or a broader molar mass distribution, as measured by the ratio $M_w/M_n$ of the weight-average molar mass $M_w$ and the number-average molar mass $M_n$. Thus the second aspect of our invention deals with preparation of a non-etherified ethylene urea-glyoxal condensed resin by reacting ethylene urea with glyoxal added in two distinct stages. This is shown in examples 5 and 6.

Example 5

Non-Etherified 2-Imidazolidinone-Ethanedial Resin by Split Glyoxal Addition

A resin according to the invention with a ratio of n(GO):n(EU)=1.10 mol/mol charged in two portions corresponding to 0.8 mol/mol and 0.3 mol/mol was prepared by the following procedure:

197.2 g (1.36 mol) of an aqueous solution of glyoxal (ethane dial, with a mass fraction of solute of 40%) were charged to a reaction vessel under a nitrogen purge and the pH was adjusted to from 6.4 to 6.7 by addition of aqueous sodium bicarbonate solution (with a mass fraction of solids of 10%). 161.5 g (1.7 mol) of ethylene urea hemihydrate were added at ambient temperature over a period of between forty-five and sixty minutes. The reaction mixture was heated to 25° C. and a mild exotherm to between 35° C. and 40° C. was observed along with a pH increase of between 0.55 and 1.5. The temperature was raised to between 42° C. and 48° C. and held for one to three hours. The heating was turned off and the reaction mixture was allowed to cool to ambient between three and four hours. 93 g (0.64 mol) of an aqueous solution of glyoxal (ethane dial, with a mass fraction of solute of 40%) were slowly charged to the flask while monitoring pH. The pH was adjusted to 6.5 by adding aqueous sodium bicarbonate solution (with a mass fraction of solids of 10%). A mild exotherm to 35° C. was observed. The temperature was maintained at 35° C. for one hour. The heating was then turned off and the reaction mixture was allowed to cool to ambient between three and four hours. The resulting product solution was filtered. After filtration, a straw yellow solution of the non-etherified product was isolated having an average value of dynamic viscosity of 820 mPa·s and a mass fraction of solids of 57.8%. Gel permeation chromatography yielded a number average molar mass $M_n$ of 878 g/mol, and a weight average molar mass $M_w$ of 1281 g/mol, with a polydispersity $M_w/M_n$ of 1.46.

Example 6

Non-Etherified 2-Imidazolidinone-Ethanedial Resin by Split Glyoxal Addition

A resin according to the invention with a ratio of n(GO):n(EU)=1.15 mol/mol charged in two portions corresponding to 0.7 mol/mol and 0.45 mol/mol was prepared by the following procedure:

160 g (1.1 mol) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 10%) to 6.4 to 6.7. 150 g (1.57 mol) of ethylene urea hemihydrate were added at ambient temperature over a period of between forty-five and sixty minutes. The reaction mixture was heated to 25° C. and a mild exotherm to between 35° C. and 40° C. was observed along with a pH increase of between 0.55 and 1.5. The temperature was raised to between 42° C. and 48° C. and held for one to three hours. The heating was then turned off and the reaction mixture was allowed to cool to ambient between three and four hours. 101 g (0.70 mol) of an aqueous solution of glyoxal (ethane dial, with a mass fraction of solute of 40%) was slowly charged to the flask while monitoring pH. The pH was adjusted to 6.5 by adding aqueous sodium bicarbonate solution (with a mass fraction of solids of 10%). A mild exotherm to 35° C. was observed. The temperature was maintained at 35° C. for one hour. The heating was then turned off and the reaction mixture was allowed to cool to ambient between three and four hours. 25 g of water were added. After filtration, a straw yellow solution of the non-etherified product was isolated having an average value of dynamic viscosity of 275 mPa·s and a mass fraction of solids of 54.8%. Its number average molar mass $M_n$ was 539 g/mol, and its weight average molar mass $M_w$ was 904 g/mol, with a polydispersity $M_w/M_n$ of 1.68.

A comparison of examples 4, 5 and 6 unveils that the values for $M_w$ are increased by the split addition process of glyoxal, according to a preferred embodiment of this invention.

The following examples show synthesis in the presence of a non-reactive solvent:

Example 7

2-Imidazolidinone-Ethanedial Resin in Water/Propylene Glycol Dimethylether

A non-etherified resin intermediate according to the process of invention was prepared by the following procedure:
288 g (1.99 mol) of an aqueous solution of glyoxal (with a mass fraction of solute of 40%) and 45 g (0.43 mol) of dipropylene glycol dimethylether were charged to a 1 L reactor under nitrogen purge and the pH was adjusted to 6.4 by addition of aqueous sodium bicarbonate solution (with a mass fraction of 10%). 171 g of ethylene urea hemihydrate were added and the mixture was then heated to 45° C. and held for one hundred and twenty minutes under stirring. The resulting product solution was filtered. The resulting unetherified product was turbid and light yellow in colour with a mass fraction of solids of 52%. The viscosity was determined to be 80 mPa·s.

Example 8

2-Imidazolidinone-Ethanedial Resin in Water/1-Methyl-2-Pyrrolidinone

A non-etherified resin intermediate according to the process of invention was prepared by the following procedure:
288 g (1.99 mol) of an aqueous solution of glyoxal (with a mass fraction of solute of 40%) were charged to a 1 L reactor under nitrogen purge and the pH was adjusted to 6.2 by addition of aqueous sodium bicarbonate solution with a mass fraction of 10%. 45 g (0.45 mol) of 1-methyl-2-pyrrolidinone were then charged to the reactor followed by 162 g of ethylene urea hemihydrate. The mixture was then heated to 45° C. and held for one hundred and twenty minutes under stirring. The resulting product solution was filtered. The resulting unetherified product was turbid and light yellow in colour with a mass fraction of solids of 52%. The viscosity was determined to be E on the Gardner-Holt scale, corresponding to 125 mPa·s, the APHA colour was 310.

As none of the glyoxal-ethylene urea resins described supra in examples 1 to 8 was subjected to an etherification step, the ratio of the amount of substance n(—O—R) of alkoxy groups as substituents of the aldehyde carbon atoms of the glyoxal chemically bound in the resins and the amount of substance n(U) of ethylene urea U chemically bound in the resins was less than the detection limit of NMR analysis, and in all cases, less than 0.01 mol/mol.

Example 9

Application Test

A crosslinkable compositions was prepared as follows:
63 g of an aqueous emulsion of a hydroxy-functional acrylic resin having a mass fraction of solids of 50%, a hydroxyl number of 41 mg/g and an acid number of 10 mg/g (RoShield® 1024, Dow) were mixed with 23.7 g of the crosslinker of example 2 having a mass fraction of solids of 57%. To this mixture, 0.9 g of methoxypropanol were added, well mixed, and then 4.5 g of a solution of p-toluene sulphonic acid, 40% strength in isopropanol, and 7.9 g of water were added to yield a mass fraction of solids of 45%, and well mixed again.

Films were prepared by applying the coating composition thus prepared to the surfaces of 101.6 mm×304.8 mm (4"×12") phosphated steel panels and of 101.6 mm×152.4 mm (4"×6") clean glass panels using a wire-wound coating bar #52 to draw down the applied formulation resulting in a uniform film. The coated panels were then allowed to flash at room temperature for fifteen minutes (at ambient conditions of 25° C.; relative humidity of 50%), or were cured for five minutes at 65° C., and film properties measured for both cases twenty-four hours later. Film hardness was measured using BYK Gardner Pendulum Hardness Tester—König hardness (measured according to ASTM D 4366, equivalent to DIN EN ISO 1522). Solvent resistance was determined as number of double rubs with methyl ethyl ketone according to ASTM D 4572 to mar and to failure (more than 50% of the coating film removed), the test was stopped at 200 double rubs

TABLE 2

| Coating Performance | | |
| --- | --- | --- |
| curing conditions | 25° C.; 24 h | 65° C.; 5 min |
| double rubs until mar \| failure | 10 \| 200 | 10 \| 200 |
| Hardness according to König | 105 s | 94 s |

Even at ambient conditions, as can be seen, good hardness and solvent resistances were obtained, as well as good film appearance.

The invention claimed is:

1. A process for making a non-etherified reaction product UA of at least one multifunctional aldehyde A and at least one cyclic urea U, wherein the ratio of the amount of substance of aldehyde groups n(—CHO) in the multifunctional aldehyde A and the amount of substance of amide groups n(—CO—NH) in the cyclic urea U is 1.0 mol/mol≤n(—CHO)/n(—CO—NH)≤1.30 mol/mol, characterised in that the reaction of U and A is conducted in the presence of a solvent which does not have functional groups that are reactive with the said at least one multifunctional aldehyde A or the said at least one cyclic urea U, or the non-etherified reaction product UA, and that the degree of etherification, measured as the ratio n(—O—R)/n(U) of the amount of substance n(—O—R) of alkoxy groups as substituents of the aldehyde carbon atoms of the multifunctional aldehyde chemically bound in the reaction product UA to the amount of substance n(U) of cyclic urea U chemically bound in the reaction products, is less than 0.01 mol/mol.

2. The process of claim 1 wherein the at least one multifunctional aldehyde A is provided as a solution in water.

3. The process of claim 1 wherein the at least one cyclic urea U is provided as a solution in water.

4. The process of claim 1 wherein both the at least multifunctional aldehyde A and the at least one cyclic urea U are provided as a solution in water.

5. The process of claim 1 wherein water is removed completely or partially after or during the reaction.

6. The process of claim 1 wherein the reaction product is dried to yield a powder.

7. The process of claim 1 characterised in that the cyclic urea U is purified before reaction with the multifunctional aldehyde by one or more processes selected from the group consisting of recrystallisation, extraction, complexation, adsorption and ion exchange reactions, distillation, sublimation, and melt crystallisation.

8. A reaction product UA made by the process of claim 1.

9. A process for making a non-etherified reaction product UA of at least one multifunctional aldehyde A and at least one cyclic urea U, wherein the ratio of the amount of substance of aldehyde groups n(—CHO) in the multifunctional aldehyde A and the amount of substance of amide groups n(—CO—NH) in the cyclic urea U is 1.0 mol/mol≤n(—CHO)/n(—CO—NH)≤1.30 mol/mol, characterised in that the process comprises at least two steps, wherein in the first step the amount of multifunctional aldehyde A used is between 20% and 80% of the total amount, and that after the first step, in at least one further step, further quantities of multifunctional aldehyde A are added and reacted with the reaction mixture formed in the previous step, and that the degree of etherification, measured as the ratio n(—O—R)/n(U) of the amount of substance n(—O—R) of alkoxy groups as substituents of the aldehyde carbon atoms of the multifunctional aldehyde chemically bound in the reaction product UA to the amount of substance n(U) of cyclic urea U chemically bound in the reaction products, is less than 0.01 mol/mol.

10. The process of claim 9 wherein a solvent which does not have functional groups that are reactive with the said at least one multifunctional aldehyde A or the said at least one cyclic urea U, or the non-etherified reaction product UA is added to the reaction mixture for the first step.

11. The process of claim 9 wherein a solvent which does not have functional groups that are reactive with the said at least one multifunctional aldehyde A or the said at least one cyclic urea U, or the non-etherified reaction product UA is added to the reaction mixture after the first step.

* * * * *